United States Patent [19]

Heckrotte

[11] Patent Number: 4,899,688
[45] Date of Patent: Feb. 13, 1990

[54] SPIN COATING APPARATUS

[75] Inventor: Robert S. Heckrotte, Wilmington, Del.

[73] Assignee: E. I. du Pont de Nemours and Company, Wilmington, Del.

[21] Appl. No.: 271,151

[22] Filed: Nov. 14, 1988

[51] Int. Cl.$^4$ .......................... B05C 3/12; C03C 25/02
[52] U.S. Cl. ...................... 118/405; 65/11.1; B05C/3/12; C03C/25/02
[58] Field of Search ............ 65/11.1, 13, 1, 3.44; 118/316, 325, 405, 420; 425/113, 114, 115

[56] References Cited

U.S. PATENT DOCUMENTS

| | | | |
|---|---|---|---|
| 4,025,256 | 5/1977 | Heller | 425/114 |
| 4,419,958 | 12/1983 | Roba | 118/405 |
| 4,455,159 | 6/1984 | Lamb et al. | 65/11.1 |
| 4,526,808 | 7/1985 | Strohmaier | 427/57 |
| 4,537,610 | 8/1985 | Armstrong et al. | 65/3.44 |
| 4,631,078 | 12/1986 | Tomlinson et al. | 68/3.11 |
| 4,713,103 | 12/1987 | Pennanen et al. | 65/11.1 |

Primary Examiner—Joye L. Woodward

[57] ABSTRACT

Continuous filament glass fiber bundles are coated with a molten thermoplastic polymer, without the addition of a size to the glass, by passing the filaments through an unpressurized pool of the polymer contained in a passage. The forces between the filaments and the unpressurized polymer interact to center the filaments in the passage as they pass through. The passage is defined by a body member and a detachable cover having contiguous surfaces joined along a longitudinal mating line which is angularly displaced from the longitudinal axis of the passage to assist in prevention of filament snagging in the melting line as they pass through the passage.

3 Claims, 3 Drawing Sheets

SPIN COATING APPARATUS

BACKGROUND OF THE INVENTION

This invention relates to an apparatus and method for coating bundles of continuous filaments. More particularly it relates to coating bundles of freshly spun continuous filament glass fibers.

Traditionally, water or water-based sizings are sprayed or coated onto glass fibers as they are formed to lubricate and protect the filaments during subsequent processing steps. These steps may include initial wind-up, chopping, drying, re-winding, packaging, shipping, and finally unwinding into an end use. Since glass fibers are inherently flaw sensitive, any "uncoupled" composite process (where the formed glass must be handled before introducing the matrix resin) will require the use of such sizings and finishes on the glass roving. In addition to added water and chemicals, moisture and other contaminants from the surrounding atmosphere will also degrade the quality of glass fibers by rapidly adsorbing onto the high energy pristine glass surface.

Since all of these added surface species (whether applied intentionally or adsorbed from the atmosphere) tend to mask the glass surface, it is very difficult to wet and adhere matrix resins onto glass fibers in composite applications. This wetting and adhesion problem is especially important for viscous thermoplastic resins and systems without intensive mixing. Organometallic materials (e.g. silanes, titanates and chromates) are commonly added to the sizing formulation to overcome these problems. Although these three component systems (glass+sizing+resin) have been under development and optimization, evidence in the literature suggests that superior wetting and adhesion could be realized if all additives and contamination were kept away from the glass surface before the matrix resin is applied,

SUMMARY OF THE INVENTION

A method has been developed for coating bundles of bare continuous filament glass fibers with one of several molten thermoplastic polymers (e.g. polyethylene terephthalate) without the need to apply lubricants to protect the bare filaments from abrasion and damage. The method includes the steps of drawing streams of glass into a bundle of continuous filaments, then passing the filament bundle through a molten unpressurized pool of thermoplastic polymer maintained at a controlled level in the coating passage of a coating shoe. The filaments are centered in the passage by means of forces produced by interaction between the polymer and the filaments flowing through the passage. Upon entering the coating shoe, the filament bundle has a surface coating of polymer. The bundle is then heated and the polymer is worked into the bundle to coat each individual filament. The glass filaments are preferably drawn in an inert atmosphere prior to coating.

The product formed, a fiber reinforced thermoplastic material, is essentially a two component material, i.e. an array of continuous glass filaments coated with thermoplastic resin that has retained the same proportion of the as-spun glass filament properties as those using three components of glass, water-based sizing and resin. A preferred coating shoe includes a body member having upper and lower surfaces connected by a passage. The passage encompasses the path and has a cross sectional area along its entire length greater than the cross sectional area of the bundle of filaments and has successive conical and straight lengths. Nozzles at opposed locations in the conical length serve to introduce molten polymer into the passage. The coating shoe has a cover (which is detachable during stringup) which forms a portion of the passage. The longitudinal mating line of the shoe and its cover is angularly displaced from the longitudinal axis of the passage. This misalignment from the longitudinal axis of the passage prevents filaments which are being forwarded in a path along the longitudinal axis from catching or being snagged in the mating line.

DETAILED DESCRIPTION OF THE PREFERRED EMBODIMENT

Figure 1:
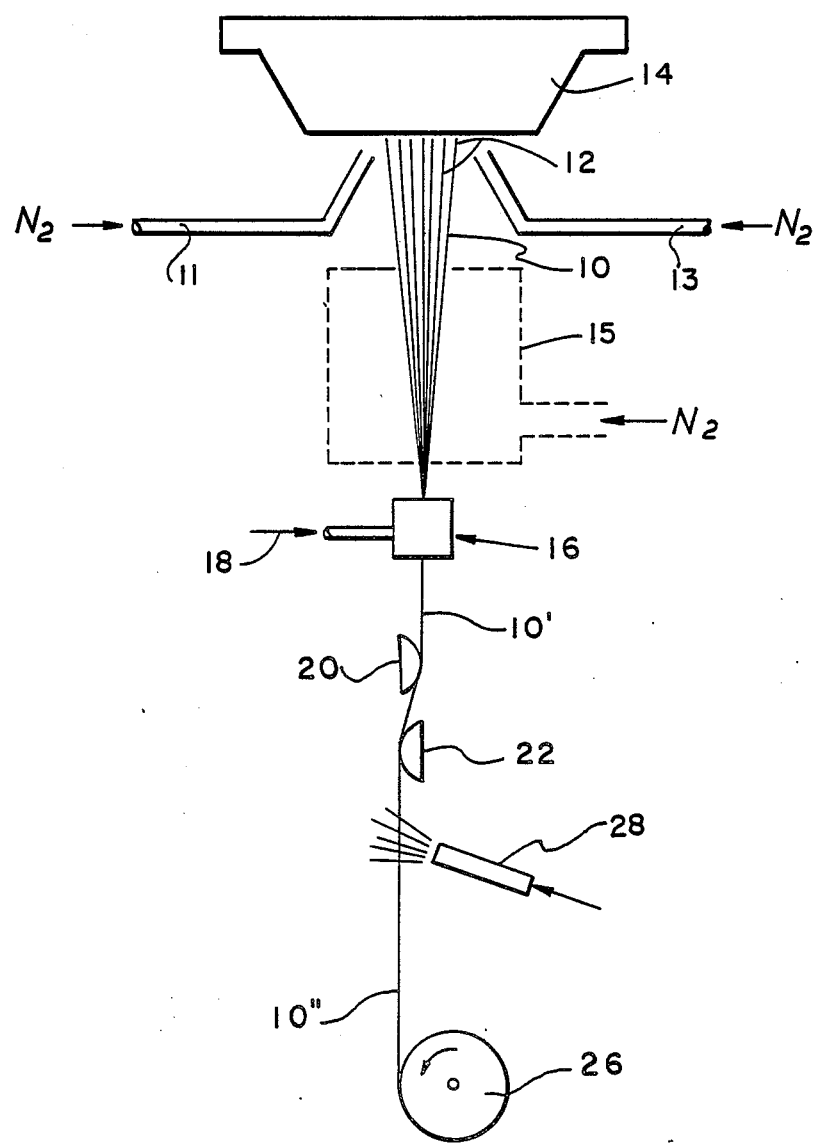
FIG. 1 is a schematic diagram illustrating the spin coating method of the invention.

The method chosen for purposes of illustration in FIG. 1 includes a bundle 10 of continuous filament glass fibers 12 being drawn from a bushing 14. The bundle 10 is forwarded through an inert nitrogen atmosphere supplied through nozzles 11 and 13 directed at bushing 14 and chamber 15 to a coating shoe 16 where in passing through a passage in the shoe the bundle is coated with molten polyethylene terephthalate polymer supplied to the shoe from a source indicated by flow arrow 18. The coating operation in the shoe is unpressurized, thus eliminating the need for a guide-seal at the entry to a pressurized polymer chamber. The interaction between the filaments and the polymer as they move through the passage centers the filaments in the passage so they do not abrade by rubbing on a surface of the passage. Upon exiting the coating shoe, the polymer coated filament bundle 10, is passed over heated rework shoes 20 and 22 and wound into a package 26. A water spray device 28, is used to spray water on the filament bundle 10' to cool it prior to winding into package 26.

Figure 2:
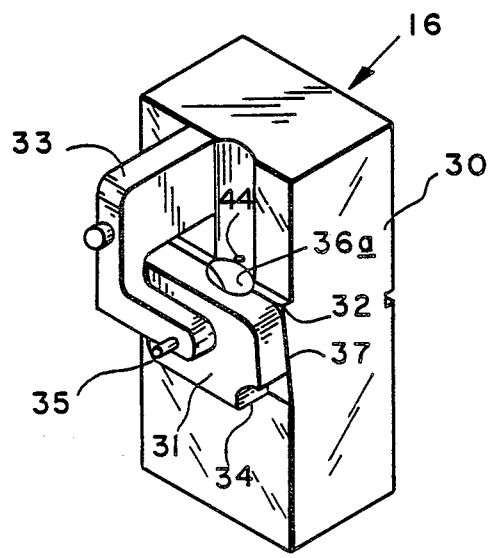
FIG. 2 is an isometric view of the coating shoe of this invention.
Figure 3:
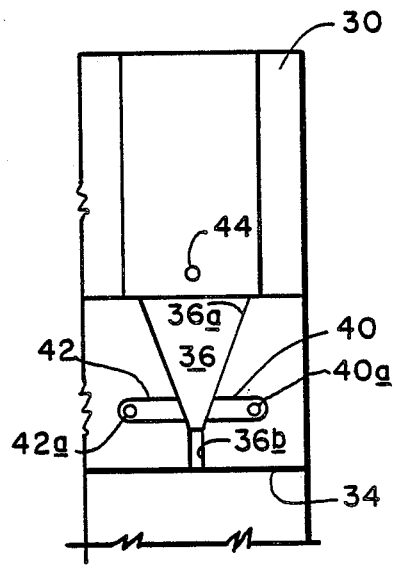
FIG. 3 is a partial front elevation view of FIG. 2 with the detachable cover removed.
Figure 4:
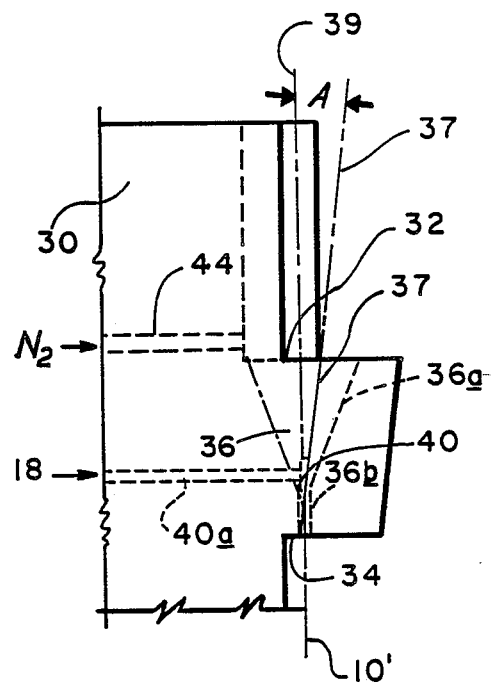
FIG. 4 is a partial side elevation view of FIG. 2 with the detachable cover in place.

Referring now to FIGS. 2-4, the coating shoe 16 is seen to include a body member 30 into which is machined an upper surface portion 32 and a lower surface portion 34 connected by a passage 36. The passage 36 has successive conical and straight lengths 36a, 36b, respectively, and each length of the passage has a cross-sectional area greater than the cross-sectional area of the fiber bundle 10 during its passage through the passage. The coating shoe includes a detachable cover 31 held against a mating surface of the body 30 by means of arm 33 attached to the body member 30 and screw 35 threaded through arm 33 to contact detachable cover 31. As best seen in FIG. 4, the surface of detachable cover 36 which mates with body member 30 at mating line 37 has a portion of the passage lengths 36a, 36b machined therein to match up with similar portions in the body member for the passage 36. The mating line 37 is angularly displaced from the longitudinal axis 39 of the passage by an angle A to minimize the possibility of filaments being snagged as they pass through the conical length 36a of the passage and are consolidated into polymer coated bundle 10' in passage length 36b. Molten polymer is introduced into passage length 36a at directly opposed locations at the mating line 37 via passageways 40, 42 supplied with molten polymer 18 through passageways 40a, 42a, respectively. The means for introducing the molten polymer can include a pair of nozzles connected to a source of polymer, with the nozzles being at directly opposed intermediate locations along the conical length 36a of the passage 36. Another passage 44 through body members 30 is used to supply nitrogen in the proximity of the upper surface 32.

Figure 5:
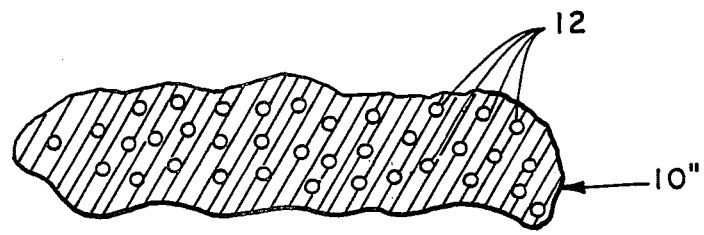
FIG. 5 is a schematic cross-sectional view greatly enlarged of the coated filament bundle following the working step subsequent to coating.

FIG. 5 shows the resultant filament bundle 10" after passing over rework shoes 20, 22 wherein the molten polymer has penetrated the bundle and coated each filament.

In operation, the interaction of the unpressurized molten polymer in passage 36 and the filament bundle 10 moving through the passage gathers the filaments together and aligns them to center them with respect to passage length 36b without the need for centering guides resulting in a coated bundle as shown in FIGS. 5 and 6 wherein the glass filaments have not been abraded by the guides. Further, the polymer streams from passageways 40, 42 are directed laterally against the filament bundle from each side of the cover mating line 37 as it passes through passage 36 to keep filaments away from the mating line to minimize the risk of their being snagged at the mating line. The slight angular displacement of the mating line 37 from the longitudinal axis of the passage 36 also assists in preventing snagging of the filaments in the mating line.

What is claimed is:

1. A fiber coating apparatus comprising: a body member and a detachable cover held together, said body member and said cover having contiguous surfaces which join at a longitudinal mating line, said surfaces having matching portions of passage lengths formed therein defining a passage through which fiber passes for coating, said passage having a conical length followed by a straight length and a longitudinal axis, said body member having a pair of passages defined therein and connected to a molten polymer supply means for introducing molten polymer into said passage at directly opposed intermediate locations along said conical length, said longitudinal mating line being angularly displaced from said longitudinal axis.

2. The fiber coating apparatus of claim 1 wherein said opposed locations are at the longitudinal mating line whereby polymer is directed away from said mating line.

3. The fiber coating apparatus of claim 1 including means located in said body member for introducing an inert gas immediately above the passage through which the fiber passes.

* * * * *